United States Patent
Waeller et al.

(10) Patent No.: US 8,370,058 B2
(45) Date of Patent: Feb. 5, 2013

(54) METHOD FOR CONTROLLING A DISPLAY DEVICE IN A MOTOR VEHICLE, AND DISPLAY DEVICE

(75) Inventors: Christoph Waeller, Braunschweig (DE); Andreas Ebert, Braunschweig (DE); Jens Fliegner, Wahrenholz (DE); Yongmei Wu, Braunschweig (DE); Heino Wengelik, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 809 days.

(21) Appl. No.: 11/919,620

(22) PCT Filed: Apr. 26, 2006

(86) PCT No.: PCT/EP2006/003879
§ 371 (c)(1),
(2), (4) Date: Dec. 9, 2009

(87) PCT Pub. No.: WO2006/117116
PCT Pub. Date: Nov. 9, 2006

(65) Prior Publication Data
US 2010/0106399 A1 Apr. 29, 2010

(30) Foreign Application Priority Data

Apr. 29, 2005 (DE) .......................... 10 2005 020 151

(51) Int. Cl.
*G01C 21/36* (2006.01)
*G08G 1/0969* (2006.01)
(52) U.S. Cl. ...................... 701/410; 701/426; 340/995.1
(58) Field of Classification Search .................. 701/410, 701/426, 425, 430, 431, 438, 461, 465; 340/995.1
See application file for complete search history.

(56) References Cited

U.S. PATENT DOCUMENTS

| | | | |
|---|---|---|---|
| 5,764,139 A | 6/1998 | Nojima et al. | |
| 6,381,534 B2 * | 4/2002 | Takayama et al. | 701/465 |

(Continued)

FOREIGN PATENT DOCUMENTS

| | | |
|---|---|---|
| DE | 197 41 316 | 3/1999 |
| DE | 199 41 966 | 3/2001 |

(Continued)

OTHER PUBLICATIONS

PCT International Search Report and Written Opinion of the International Searching Authority, PCT International Application No. PCT/EP2006/003879, dated Jul. 26, 2006 (English-language translation provided).

(Continued)

*Primary Examiner* — Tan Q Nguyen
(74) *Attorney, Agent, or Firm* — Kenyon & Kenyon LLP

(57) ABSTRACT

In a method for controlling a display device in a motor vehicle, the display device displays a geographic map having elements which are assigned geographic positions and which are displayed on the displayed map at the geographic positions they are assigned. The relevance of the elements displayable on the map for the user is evaluated and an automatic decision is made as a function of the result of the evaluation as to which elements are displayed at the geographic positions they are assigned. A display device in a motor vehicle includes a control device, a display connected to the control device, a memory or a plurality of memories for storing data for displaying a geographic map and for storing elements that are assigned geographic positions and which are displayable on the displayed map at the geographic positions they are assigned. The display device includes a decision processor, which is connected to the control device, by which the relevance of the elements displayable on the map is able to be evaluated, and an automatic decision is able to be made as a function of the result of the evaluation as to which elements will be displayed at their assigned geographic positions.

25 Claims, 3 Drawing Sheets

U.S. PATENT DOCUMENTS

| | | | |
|---|---|---|---|
| 6,405,129 B1 * | 6/2002 | Yokota | 701/438 |
| 6,438,488 B2 | 8/2002 | Lee | |
| 6,477,460 B2 * | 11/2002 | Kepler | 701/426 |
| 6,542,814 B2 | 4/2003 | Polidi et al. | |
| 2003/0028322 A1 | 2/2003 | Ogawa | |
| 2003/0036848 A1 * | 2/2003 | Sheha et al. | 701/209 |
| 2004/0054468 A1 | 3/2004 | Yamada et al. | |
| 2005/0165543 A1 * | 7/2005 | Yokota | 701/204 |
| 2005/0280602 A1 | 12/2005 | Tzschoppe et al. | |
| 2006/0285206 A1 | 12/2006 | Tzschoppe et al. | |
| 2007/0032942 A1 * | 2/2007 | Thota | 701/200 |

FOREIGN PATENT DOCUMENTS

| | | |
|---|---|---|
| DE | 199 51 546 | 5/2001 |
| DE | 696 13 653 | 5/2002 |
| DE | 101 44 781 | 3/2003 |
| DE | 101 62 182 | 7/2003 |
| DE | 103 09 194 | 10/2004 |
| DE | 103 20 530 | 11/2004 |
| EP | 0 673 010 | 9/1995 |
| EP | 1 128 163 | 8/2001 |
| JP | 2005 010080 | 1/2005 |
| WO | WO 03/062749 | 7/2003 |
| WO | WO 2004/099719 | 11/2004 |

OTHER PUBLICATIONS

PCT International Preliminary Report on Patentability, PCT International Patent Application No. PCT/EP2006/003879, dated Oct. 30, 2007, (English-language translation provided).

* cited by examiner

METHOD FOR CONTROLLING A DISPLAY DEVICE IN A MOTOR VEHICLE, AND DISPLAY DEVICE

FIELD OF THE INVENTION

The present invention relates to a method for controlling a display device in a motor vehicle, e.g., in which the display device displays a geographic map having elements to which geographic positions are assigned and which are shown on the displayed map at their assigned geographic positions. Furthermore, the present invention relates to a display device, e.g., in a motor vehicle having a control device, a display connected to the control device, a memory or a plurality of memories for storing data for the display of a geographic map and for storing elements to which geographic positions are assigned and which are representable on the displayed map at their assigned geographic positions.

BACKGROUND INFORMATION

Methods for controlling a display unit or display units are used in a vehicle, in particular in conjunction with navigation systems. In addition to detailed road maps, such navigation systems are able to display a multitude of special destinations (also referred to as points of interest POI). Points of interest are, for instance, elements that are displayed at their geo-positions on the geographic map. They include gas stations, restaurants and landmarks, for example. Furthermore, the position of a friend may be treated as mobile point of interest. Even the purchase of asparagus at the side of the road or a temporary traffic jam may be treated as point of interest. The points of interest are typically placed in categories. The user can choose which category he wishes to have displayed. All points of interest falling into the selected categories will then be shown on the geographic map. However, since this may involve a very high number of points of interest, some navigation systems fade out the special points of interest or display them at reduced size starting with a particular scale.

Such a display of the points of interest has the disadvantage that the user is frequently required to set the desired categories of the points of interest manually. Furthermore, given a multitude of selected categories, a large number of points of interest is also shown simultaneously, so that the user loses track of things rapidly. All points of interest located in the visible region of the map will be displayed, without taking the type of the points of interest into consideration.

German Published Patent Application No. 199 41 966 describes a method and a device for the display of warning messages. A display unit of a navigation system displays a digital road map on which points of interest have been marked. Furthermore, warning messages are displayed on the digital road map at their geographic positions, using pictograms. Due to the local distribution of the warning messages, it is very easy for the vehicle driver to judge the relevance of the individual warning messages for his or her own route. A disadvantage of the method is that a great many points of interest may be shown simultaneously, so that the display becomes cluttered.

A display device for vehicles for displaying the range is described in German Published Patent Application No. 197 41 316. Using a navigation system, the distance of the instantaneous driving location to the desired destination is calculated. Furthermore, it is calculated whether the available energy quantity is sufficient to reach the destination without refueling. If it turns out that the destination cannot be reached without refueling, then a message about the gas stations available via a specific detour from the direct route to the destination will be provided. These gas stations are displayed on a display indicating the distance, independently of the display of the navigation system.

An information display device for vehicles is described in German Published Patent Application No. 696 13 653. In this display device, the importance of information is evaluated as a function of a determined driving state, and the information is displayed according to the degree of importance.

Disadvantageous in this information display device is that it is difficult for the user to understand the information easily and intuitively.

SUMMARY

Example embodiments of the present invention provide a method and a display device by which the elements displayed on the geographic map are made easier to comprehend and which does not distract the user by the control of the method or the recording device.

In an example embodiment of the method, the relevance of the elements displayable on the map to a user of the motor vehicle is evaluated and an automatic decision as to which elements are displayed at the geographic positions they are assigned is made as a function of the result of the evaluation. The elements are points of interest, for example. Depending on the situation, there is consequently no need for the user to modify the categories of the elements to be displayed on the map. The relevance is evaluated with regard to its importance independently of the category association, and the decision as to whether an element is to be displayed is made as a function of this evaluation. In this manner, depending on the scale of the map, the number of the displayed elements is able to be limited in order to allow the user to comprehend the elements rapidly, easily and intuitively.

At least one of the elements displayable on the map may be assigned a geographic position and a time parameter. The probable time by which the geographic position of this element is able to be reached is estimated. In evaluating the relevance of this element, the estimated time of arrival is related to the time parameter. The time parameter of the element may refer to opening hours and/or starting times, for instance. In this case, it is indicated whether the expected time of arrival is within the opening hours or before the starting time. It is therefore easy for the user to understand whether an institution assigned to the element is able to be reached during its opening hours or whether it is possible to reach an event assigned to the element in time before the start of the event.

The element may be displayed on the map only if the expected time of arrival is within the opening hours or before the starting time. If the expected time of arrival is outside of opening hours or after the starting time, then this element has low relevance for the user. The element will then not be shown, which reduces the number of displayed elements or allows the display of another element that has greater relevance for the user.

The relevance of the displayable elements and/or the type of display of the displayed elements may depend on contacts and/or appointments of the user. In this manner, an element may be displayed in particular in those cases where it is linked to an appointment or a contact of the user. For example, if the user has a reservation at a restaurant at a specific time, then the display of this restaurant is of very high importance to the user. The relevance of this element is therefore very high due to the linkage to the appointment.

Earlier evaluations of the particular elements may be taken into account in evaluating the elements. This may be of special importance if the user is able to influence the evaluations. For instance, if the user had assigned a high rating to an element such as a restaurant at one point, then the relevance of this element increases in future evaluations. This makes it possible, for instance, to show the favorite restaurant of the user before other restaurants.

A user profile may be transmitted, and this user profile may be taken into account in evaluating the elements. Part of the user profile is any information that the user has input into the system about him/herself or that the system is able to ascertain about the user. For example, such information includes interests of the user of which the system had been informed, for instance through the specification of categories (such as Italian restaurants), and meta-interests (such as elements suitable for families).

Furthermore, the purpose of the trip may be ascertained on the basis of an appointment book, and the determined purpose of the trip may be taken into account in evaluating the elements. If the purpose is a drive to work, then different elements are relevant for the user than in the case of a vacation trip. The purpose of the trip could also be input by the user or determined by the system itself based on the input destination and the time of day.

Weather data may be acquired and/or transmitted, and this weather data may be taken into account in evaluating the elements. In addition, vehicle state information may be acquired and such vehicle state information be taken into consideration in evaluating the elements. Among others, the fuel level, possible defects or service intervals are part of vehicle state information. If a defect has occurred, then the display of service stations has high relevance. If the tank is nearly empty, then the display of gas stations in the area has high relevance.

Another aspect of the method concerns the manner in which the elements are displayed on the geographic map. Elements having higher relevance may be displayed in a graphically emphasized manner by being spatially stacked in a three-dimensional manner. In particular, the elements having higher relevance are displayed further in the foreground than elements having lower relevance. In order to achieve the spatial stacking, the elements can be displayed autostereoscopically. This means that the two eyes of the user see different views of the element. The user reassembles both views into a three-dimensional image of the element. This makes it possible to obtain a real, three-dimensional impression, i.e., not just a perspective representation of the element. In addition to the three-dimensional stacking, the elements may be shown in different semitransparent planes. This type of display of the elements facilitates the rapid and intuitive comprehension, especially of the elements having high relevance for the user.

The elements may be read out from a memory located in the vehicle. The elements may be transmitted via wireless networks. In the latter case, they may be buffer-stored in the vehicle, depending on the circumstances.

Another aspect of the method concerns personalization of the method, which makes the communication between the user and the control system of the display easier and more intuitive. User interests and user missions may be taken into account in the process.

The control of the display device and a computer system connected thereto may be implemented as a function of the user settings, the settings reflecting the mood of the user. The mood of the user is taken into account in evaluating the relevance of the elements displayable on the map. As a result, users are able to communicate their current mood and interests to a personalization system, which is connected to the control system of the display device.

A multitude of the computer system's functions may be controlled. The control of the functions depends on parameters. The parameters are assigned different values that are allocated to specific settings of the user's mood, so that a setting of the user's mood defines a plurality of parameter values.

For example, the mood of a user may correspond to the user's expectations with regard to the control of the computer system or with regard to the current interests of the user as to destination and/or purpose of the ride with the motor vehicle. Furthermore, the mood settings may reflect the user's wish for information or entertainment, arrival at the destination, or the user's need to control the computer system. The mood settings may indicate how much information the user wishes to receive. The selection of the displayed elements and/or the type of display of the elements are/is a function of the mood settings.

The display device may include a decision processor, which is connected to the control device and which may be used to evaluate the relevance of the elements displayable on the map, and by which an automatic decision as to which elements will be displayed at their assigned geographic positions is able to be made as a function of the result of the evaluation.

For at least one element displayable on the map, a time parameter may be stored in the memory. The control device includes a device for calculating the expected time by which the geographic position of this element can be reached, and the decision processor relates the estimated time of arrival to the time parameter when evaluating the relevance of this elements. Furthermore, it is possible to store contact data and/or appointment data of the user, e.g., in the memory, the decision processor taking this information into account in connection with the relevance of the displayable elements and/or the control device considering it in the type of display of the elements. Furthermore, a user profile may be able to be stored in the memory. An interface to a vehicle bus may be provided via which the vehicle state information can be transmitted.

The display may be configured for the autostereoscopic display of the elements. For instance, an optical structure or filter mask may be disposed in front of a conventional liquid crystal display. This mask causes the two eyes of the viewer to perceive different images of an element, for example, which are reassembled into a three-dimensional image by the user.

A radio interface for the wireless transmission of the displayable elements may be provided.

Manual setting controllers may be provided for setting the mood of the user. In this case, the decision processor considers the setting of the setting controllers for the user's mood when it evaluates the relevance of the elements displayable on the map. At least one setting controller may be used in each case for setting the user's need for arrival at a destination and the user's need for control of the display device, or it may be employed to adjust the amount of information the user wishes to receive.

Example embodiments of the present invention are described below with reference to the appended Figures.

DETAILED DESCRIPTION

Figure 1:
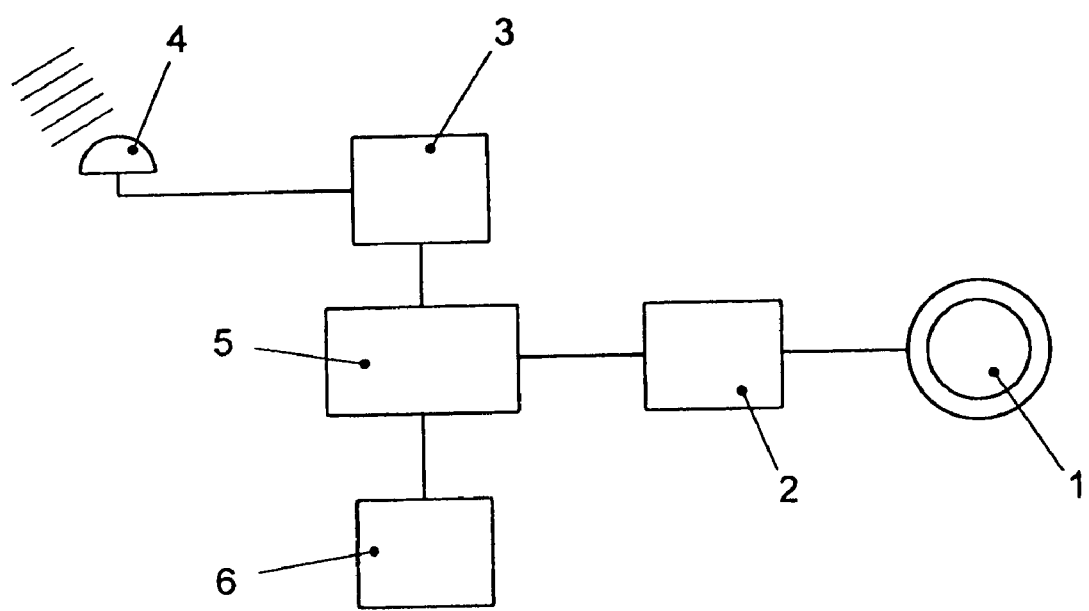
FIG. 1 schematically illustrates the general configuration of a display device according to an example embodiment of the present invention.

The general configuration of the display device will first be described with reference to FIG. 1.

The display device includes a display 1, which is connected to a control device 2. In the case at hand, display 1 is in the form of a disk. Other forms such as a square, rectangular or elliptical display are also possible.

Control device 2 is connected to a decision processor 5, which in turn is connected to a navigation system 3 on one side, and to a memory 6 on the other side. Navigation system 3 includes a memory for storing data for the display of a geographic map, or it is connected to such a memory. Via decision processor 5, navigation system 3 transmits such data to control device 2, which forwards the data to display 1 for the display of a segment of a digital geographic map. Furthermore, navigation system 3 is connected to a receiver 4 for satellite signals, such as a global positioning system (GPS) receiver. Other satellite navigation systems, including the future Galileo system, may be utilized in the same manner. In addition, it is also possible to integrate display 1, control device 2 and navigation system 3 into a single device. This could include decision processor 5 as well.

Memory 6 stores elements that are additionally to be shown on display 1 together with the segment of the geographic map. The elements are assigned geographic positions. Via decision processor 5, the data for displaying these elements are transmitted from memory 6 to control device 2, which processes the data such that the elements are displayed on the segment of the displayed geographic map at their assigned geographic positions. Memory 6 could also be integrated in navigation system 3.

Decision processor 5 evaluates the relevance of the elements displayable on the geographic map. As a function of the result of this evaluation, decision processor 5 automatically decides which elements will be transmitted to control device 2 for display on display 1. The configuration and function of decision processor 5 is described in greater detail below.

Figure 2:
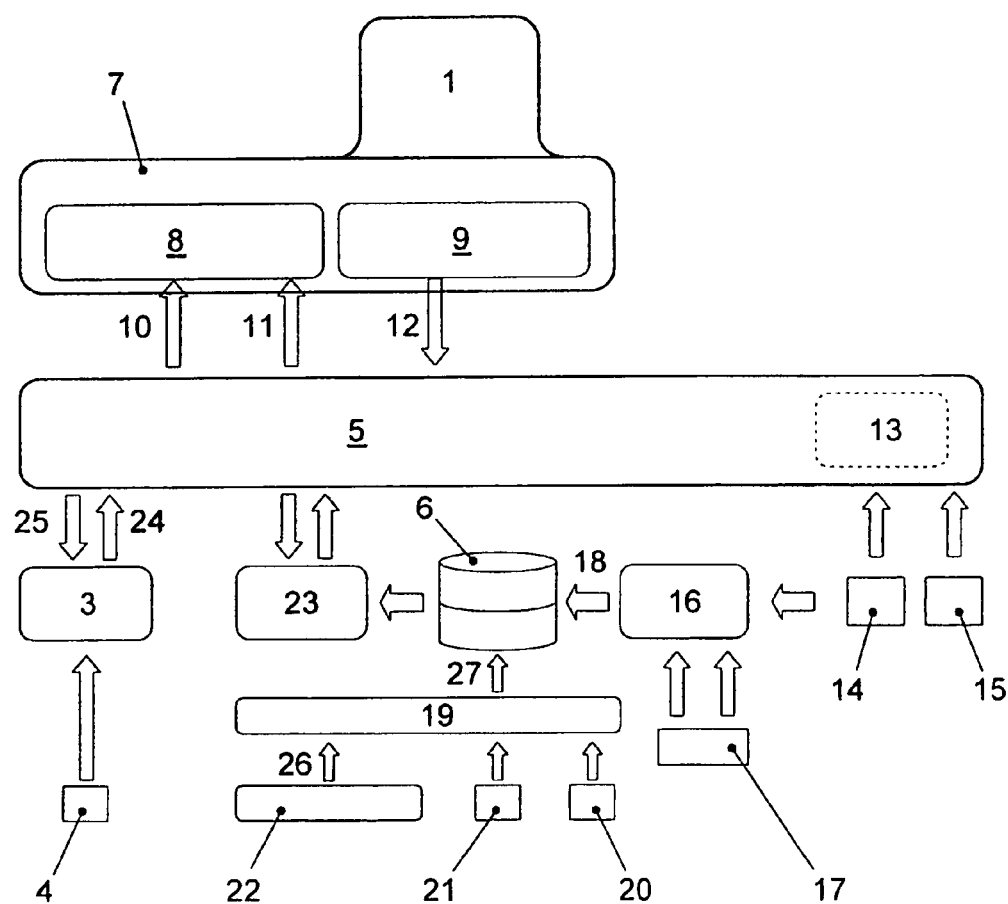
FIG. 2 shows the configuration of a display device with further details.

FIG. 2 shows the basic architecture of a navigation system for a motor vehicle in which the display device is integrated. The system has a user interface 7 (human-machine interface, HMI). On the one hand, it is used to output the geographic navigation map, and on the other hand, it allows the user to interact with the system. To this end, user interface 7 has a renderer 8, which is responsible for displaying the geographic navigation map including the elements displayed at their assigned geographic positions.

To reproduce the display, user interface 7 includes display 1. Display 1 may be a conventional liquid crystal display for two-dimensional images or it may be some other display device that is suitable for use in a motor vehicle. In addition, however, display 1 may also be configured for the autostereoscopic, three-dimensional display of images. In order to achieve the autostereoscopic effect, a mask may be disposed in front of a conventional liquid crystal display, for example, which modifies the light emission of the light radiated by the liquid crystal display such that autostereoscopic images are able to be displayed. The mask is a wavelength-selective filter mask, for instance, or an optical structure mask. The mask makes it possible to distinguish between partial images that are part of different views and to radiate each view in a different direction. That is to say, partial images for the right and for the left eye are able to be separated. When viewing display 1, the partial images can be reassembled into a three-dimensional image. No further aids such as glasses, etc., are required for this purpose. Reference is made to German Published Patent Application No. 103 09 194 and German Published Patent Application No. 103 20 530 with regard to additional details of autostereoscopic display 1.

Furthermore, user interface 7 has a configurator 9 via which the user is able to adjust the system according to the user's preferences. User interface 7 as a whole thus also includes control device 2 shown in general in FIG. 1. In addition, user interface 7 may encompass setting controllers for the user's mood, as described below.

Decision processor 5 is the central module in the navigation system, which accepts the information from all components and specifies which elements are displayed on display 1. To this end, using connection 10, decision processor transmits route and position data to renderer 8 of user interface 7. Decision processor 5 receives these route and position data from navigation unit 3 via connection 24. Navigation unit 3 is connected to a GPS receiver 4 for the navigation.

With the aid of configurator 9 of user interface 7, the user is able to make adjustments to the navigation system. These settings are transmitted by configurator 9 to decision processor 5 via connection 12. For instance, the user is able to input a destination for the navigation via configurator 9. Configurator 9 transmits this destination via connection 12 to decision processor 5, which transmits the destination data to navigation unit 3 via connection 25. Navigation unit 3 calculates a route from this and transmits the data for the particular geographic map to be displayed via connection 24 to decision processor 5, which forwards it to user interface 7.

Furthermore, with the aid of a preselection device 23, decision processor 5 is connected to a memory 6 for the elements displayable in connection with the geographic map, the memory being configured as database. In this exemplary embodiment, the elements are so-called points of interest. At least information regarding the geographic position of a point of interest is available in the database. Furthermore, the following additional information regarding the point of interest may be included in the database:

First of all, every point of interest usually has a name and an icon for the display on the geographic map. The geographic position of the point of interest is stored such that the data are able to be processed by renderer 8 for the display in connection with digital road maps. A point of interest may also be mobile. This is the case, for example, if the point of interest is assigned to a person who is traveling in a vehicle, for instance. Furthermore, the point of interest is assigned to one category or a plurality of categories. If the point of interest is assigned to a gas station, then this point of interest is assigned to the GAS STATION category. If a shop is associated with the gas station, then the gas station may additionally be included in the CONVENIENCE STORE category and normally also in the RESTROOM category.

In addition to the categories, it is also possible to assign a string of key words (so-called meta information) to a point of interest for the purpose of defining it more precisely. For instance, it is possible to specify that a particular museum is more suitable for children or families.

Furthermore, a point of interest may have a time relevance in some manner. For this reason a time parameter may be assigned to a point of interest. For instance, this could be the opening hours of the facility assigned to the point of interest or the starting times of an event assigned to the point of interest. If the point of interest is a soccer arena, for example, then this point of interest may be assigned the starting time of a soccer game. If the point of interest is assigned a supermarket, then the opening hours of this supermarket may be stored. In addition, the point of interest may be a location where the user has an appointment. The starting time of the appointment may then be stored in database 6 in conjunction with this point of interest.

Evaluation information in connection with points of interest may be stored in the database. For example, the results of previous evaluations of this point of interest may be stored. Furthermore, evaluations of the point of interest by the user or by other users may be stored.

The points of interest are able to be administered in the database in a static or dynamic manner. Static points of interest are available in the system on a permanent basis. They may be input into the system via a navigation data carrier, for example. Dynamic points of interest reach the database during operation, such as via a wireless connection. A local point of interest server 22, which communicates with an external data acquisition 19 via a W-LAN connection 26, may be provided for this purpose. External data acquisition 19 may also be coupled to a mobile radio network 21 and a broadcasting network 20. External data acquisition 19 makes it possible to add points of interest from external sources to the database of memory 6, using connection 27.

Furthermore, a generator 16 for personal points of interest is provided. Generator 16 is able to generate points of interest from the user profile, the user's appointments and contacts, and to transmit them to memory 6 via connection 18. Generator 16 obtains the appointments and contacts of the user from the user's organizer 17. Via unit 14, it is additionally possible to transmit a user profile both to generator 16 for generating the personal points of interest, and to decision processor 5. In addition, vehicle state data may be transmitted to decision processor 5 using unit 15, such as the vehicle bus.

In the following text it will be described in which manner decision processor 5 selects the points of interest to be displayed at their assigned geographic positions on the geographic map generated by navigation unit 3.

Decision processor 5 evaluates the relevance of the points of interest that are displayable on the geographic map. This evaluation is implemented as a function of the environmental situation of the vehicle, the user's personal requirements, as well as data in connection with the state of the vehicle.

Therefore, it will first be described in which manner these data on whose basis the evaluation is implemented are acquired.

The user profile, which influences the selection of personal points of interest via unit 14 on the one hand, and which influences the evaluation by the decision processor directly, on the other hand, includes any information that the user has input into the system about him/herself, or which the system is able to ascertain about the user. For example, these are interests of the user, the purpose of the trip, or the home location of the user.

The environment information concerns any information to be provided about the current environment, for instance, the current date, in particular the day of the week, the time of day, and the weather. These data may either be transmitted by navigation unit 3 to decision processor 5. Furthermore, they may be acquired via external data acquisition 19 and reach decision processor 5 via preselection 23 of the points of interest.

With the aid of the vehicle bus, i.e., unit 15, data regarding the current state of the vehicle may be transmitted to decision processor 5. Specifically, these vehicle state data concern information regarding the fuel level, error messages of the control devices of the vehicle, and service intervals.

The state of navigation unit 3 influences the evaluation by decision processor 5. The state includes information about the setting of the zoom of the navigation unit, i.e., the size of the map segment currently displayed on display 1, whether a destination is known and how far away it is, as well as the current speed. Furthermore, information about the type of road on which the vehicle is currently traveling is part of this information.

Using the aforementioned information, decision processor 5 implements an evaluation of the displayable points of interest with the aid of rules from a rule base 13. The result of this evaluation is a list of points of interest sorted according to their importance. For instance, every point of interest may be assigned a point rating. There are many possibilities for evaluating the points of interest on the basis of the rules. The rules may be designed to be very flexible and adaptable to the user's requirements. A distinction must be made between rules that relate to a particular point of interest, and rules that relate to a plurality of points of interest. In the following text, a few rules that relate to one point of interest are described by way of example:

Tank content: If the tank of the motor vehicle is at a low level, points of interest that relate to gas stations will be given a higher rating. For instance, a specific limit value for the tank content may be stored in this context, which, if not attained, results in the higher rating of the points of interest in connection with gas stations.

User categories: If a point of interest is within a category selected by the user, then this point of interest receives a higher rating.

Direction of travel: If a point of interest is in the direction of travel or on a route calculated by navigation unit 3, then it receives a higher rating. This may simultaneously depend on the category of the point of interest.

Maximum distance: Depending on the category, points of interest are shown only up to a maximum distance.

Traffic obstruction: If a point of interest is a traffic obstruction such as a traffic jam, then it receives a very high rating.

Distance dependence: In general, a point of interest may receive an increasingly higher rating the closer it is located to the user.

Evaluation characteristic: Previous evaluations of this point of interest are taken into account in the evaluation of the points of interest. This is to prevent that a point of interest will be faded out again shortly after being displayed on the map.

Two examples for rules that concern a plurality of points of interest are described in the following text:

Number depending on the category: With certain categories only a limited number of points of interest associated with this category will be displayed on the geographic map. For instance, the maximum number of ATMs displayed simultaneously may be limited to three since a display of more ATMs would not be helpful for the user.

Maximum number of all displayed points of interest: The maximum number of points of interest shown is limited in order not to overload the display.

The afore-described rules may be provided to be even much more complex. The scenario relating to the tank content rule may be provided further in the following manner, for example: If too little fuel is in the tank, a display of gas stations will take place, i.e., e.g., gas stations of the brand the user prefers, if possible. The lower the fuel level, the greater the likelihood that even gas stations of different brands will be shown. However, only a meaningful number of gas stations will be displayed since the user ultimately will refuel only at a single gas station. The gas stations displayed should be located along the scheduled route, unless one of the following exceptions occurs: The fuel level is so low that the driver should accept longer detours or even turn back; it is only the beginning of or right before the end of the scheduled route; a short ride in the opposite direction would consume less time than the detour when adhering to the route. Furthermore, decision processor 5 could also consider the current gas prices when selecting the gas stations. The pertinent data could be obtained by decision processor 5 from external data acquisition unit 19.

In addition, time parameters that are assigned to the points of interest play an important role for the decision processor. For instance, if, based on the calculations of navigation unit 3, a point of interest can be reached only outside of opening hours or a starting time, then this point of interest receives a low rating. If a point of interest is assigned an appointment for the user, then this point of interest receives a very high rating.

Once decision processor 5 has rated the relevance of the points of interest and it is determined how many points of interest are able to be displayed on the geographic map currently shown on display 1, then the displayable number of points of interest is transmitted to renderer 8 via connection 11 in the order of their relevance. In the process, the geographic positions of the points of interest to be displayed are transmitted as well. Renderer 8 then supplements the points of interest at the geographic positions on the map supplied by navigation unit 3, so that the points of interest are displayed on display 1 at their assigned geographic positions.

Figure 3:
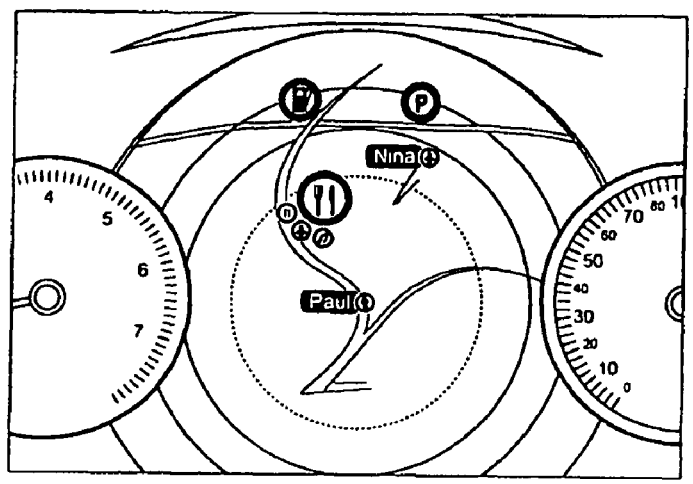
FIG. 3 shows the display of a display device.

FIG. 3 shows an example of such a display. Displayed are the current position of the vehicle, a restaurant and a gas station along the route, as well as a parking spot and the address of a contact of the user in the proximity of the route. If display 1 is suitable for an autostereoscopic display and the tank is nearly empty, for instance, then the gas station could be shown in an elevated plane in order to emphasize it. This allows an intuitive understanding of the high relevance of this point of interest via three-dimensional stacking. In general, all points of interest are able to be coded with regard to their relevance via their three-dimensional display as a function of the evaluation by decision processor 5. Points of interest having high relevance appear in closer proximity to the user. If the relevance of a point of interest changes during the display phase, then the spatial proximity is modified accordingly in the form of a discrete animation. However, image jumps should be avoided in order not to distract the driver.

If display 1 is unsuitable for an autostereoscopic display of the points of interest, then the effect may also be simulated as an image or graphic display in two dimensions and displayed on a normal two-dimensional display 1. Furthermore, other display approaches that utilize three-dimensional stacking are possible as well, such as, for instance, with the aid of superposed, semitransparent displays or with the aid of projections onto reflecting surfaces lying one behind the other.

Figure 4:
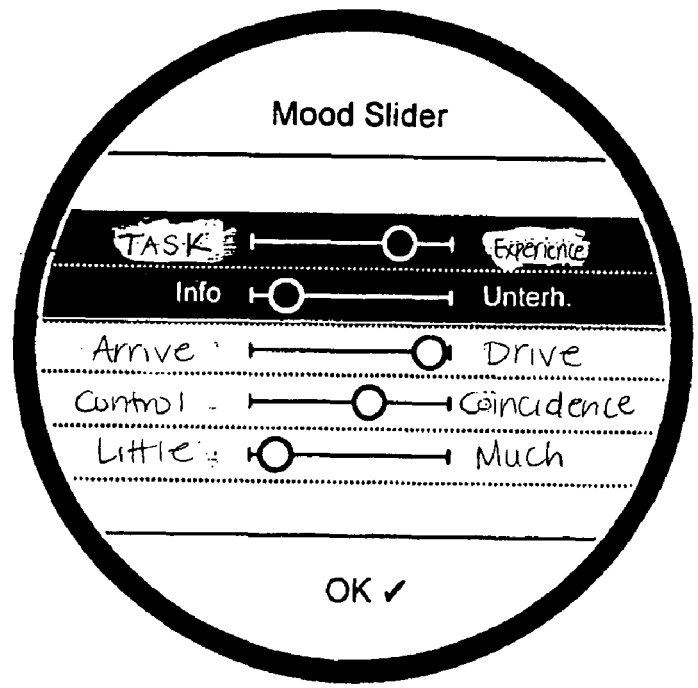
FIG. 4 shows the setting controllers for inputting the user's moods.

FIG. 4 shows a unit which the user may use to input his/her current mood in an abstract manner. This unit is part of configurator 9 of user interface 7. The settings of the various setting controllers of this unit influence the evaluation of the points of interest by decision processor 5. The unit shown in FIG. 4 thus is an intuitive interface solution for the easy communication of user interests and user missions vis-à-vis the display device as part of a personalization system. The individual setting controllers may be adjusted between two extreme interest targets so as to correspond to the instantaneous situation and mood of the user. The setting controllers may be implemented both as virtual slide controls on display 1 or some other display, and also as physical setting controllers. The instantaneous settings of the setting controllers may be transmitted to decision processor 5 via an actuating button or automatically. Given correct selection of the criteria, the various setting combinations of the setting controllers produce a differentiated picture of the current user state from the user's perspective. The settings of the setting controllers shown in FIG. 4 provide information about the type of ride, the mood of the user, and the desired information extent. However, the principle of these setting controllers for setting the user's mood could basically also be transferred to other usage contexts, such as the music selection, tourism or news. They are used to supplement the acquired environment data or static user data.

The setting controllers reproduce in detail the extent to which the user is interested in carrying out a specific task or wishes to have a freer hand in designing the ride. The user is able to adjust the extent to which he/she is interested in information on the one hand or entertainment on the other, in reaching the destination or to which extent he is interested in the ride itself. The driver may indicate how much control he wants to exert over the system or to which extent he wants the system to take over the control, and also how much or how little information he wishes to receive in general. The setting of the setting controllers thus corresponds to the current interests of the user with regard to destination and/or purpose of the trip.

LIST OF REFERENCE NUMERALS 1 display
2 control device
3 navigation system
4 receiver for satellite signals
5 decision processor
6 memory
7 user interface
8 renderer
9 configurator
10 connection
11 connection
12 connection
13 rule base
14 unit for user profile
15 vehicle bus
16 generator for personal points of interest
17 organizer
18 connection
19 external data acquisition
20 broadcasting network
21 mobile radio network
22 point of interest server
23 preselection
24 connection
25 connection
26 W-LAN connection
27 connection

What is claimed is:

1. A method for controlling a display device in a motor vehicle, comprising:
evaluating a relevance for a user of the motor vehicle of elements displayable on a geographic map;
automatically determining, based on the evaluation, which elements which will be displayed at geographic positions assigned to the elements; and displaying, on the display device, the geographic map the elements at the assigned geographic positions based on the automatic determination.

2. The method according to claim 1, further comprising:
assigning to at least one of the elements displayable on the map a geographic position and a time parameter;
calculating an estimated time by which the geographic position of the at least one assigned element is reachable; and
relating an estimated time of arrival to the time parameter in the evaluation of the relevance of the element.

3. The method according to claim 2, wherein the time parameter of the element relates to at least one of (a) open hours and/or (b) start times, the displaying indicating whether the expected time of arrival is at least one of (a) within the opening hours and/or (b) before the starting time.

4. The method according to claim 2, wherein the time parameter of the element relates to at least one of (a) open hours and/or (b) start times, and the element is displayed on the map only if the estimated time of arrival is at least one of (a) within the open hours and/or (b) before the starting time.

5. The method according to claim 1, wherein at least one of (a) the relevance of the displayable elements and/or (b) a type of display of the displayed elements is a function of at least one of (a) contacts and/or (b) appointments of the user.

6. The method according to claim 1, wherein the evaluation includes taking into account previous evaluations of particular elements.

7. The method according to claim 1, further comprising transmitting a user profile, the evaluation including taking into account the user profile.

8. The method according to claim 1, further comprising at least one of:
(a) ascertaining a purpose of a trip in accordance with an appointment book, the evaluation including taking into account the ascertained purpose of the trip;
(b) at least one of (a) acquiring and/or (b) transmitting weather information, the evaluation including taking into account the weather information; and/or
(c) acquiring vehicle state information, the evaluation including taking into account the vehicle state information.

9. The method according to claim 1, wherein the displaying includes displaying elements having higher relevance in a graphically emphasized manner via three-dimensional stacking.

10. The method according to claim 1, wherein the displaying includes displaying elements having higher relevance further in a foreground than elements having lower relevance.

11. The method according to claim 9, wherein the displaying includes at least one of:
(a) displaying the elements autostereoscopically for three-dimensional stacking; and/or
(b) displaying the elements in different, semi-transparent planes for three-dimensional stacking.

12. The method according to claim 1, further comprising reading the elements from a memory which is located inside the vehicle.

13. The method according to claim 1, further comprising transmitting the elements via a wireless network.

14. The method according to claim 1, further comprising controlling the display unit and a computer system connected thereto as a function of user settings, the settings reflecting a mood of the user.

15. The method according to claim 14, wherein the evaluating includes taking into account the mood of the user.

16. The method according to claim 14, wherein a plurality of functions of the computer system is controlled, the control of the functions is a function of parameters, the parameters are assigned values that are assigned to particular settings of the mood of the user, so that a setting of the mood of the user defines a plurality of parameter values.

17. The method according to claim 14, wherein at least one of:
(a) the mood of the user corresponds to expectations of the user with regard to control of the computer system;
(b) the mood of the user corresponds to current interests of the user with regard to at least one of (a) destination and/or (b) purpose of a trip with the motor vehicle;
(c) the mood settings reflect the user's need with regard to at least one of (a) information and/or (b) entertainment;
(d) the mood settings reflect the user's need with regard to arrival at a destination;
(e) the mood settings reflect the user's need with regard to control of the computer system;
(f) the mood settings reflect how much information the user desires; and/or
(g) at least one of (a) a selection of the displayed elements and/or (b) a type of display of the elements is a function of the mood settings.

18. A display device for a motor vehicle, comprising:
a control device;
a display device connected to the control device;
at least one memory configured to store data for display of a geographic map and configured to store elements to which geographic positions are assigned and which are displayable on the displayed map at assigned geographic positions; and
a decision processor connected to the control device configured to evaluate a relevance of the elements displayable on the map and configured to make an automatic decision as a function of a result of the evaluation as to which elements will be displayed at the assigned geographic positions.

19. The display device according to claim 18, wherein at least one of:
(a) the memory is configured to store a time parameter for at least one element displayable on the map, the control device coupled to a calculation device configured to calculate an estimated time by which the geographic position of the element is reachable, the decision processor configured to relate an estimated time of arrival to the time parameter in evaluation of the relevance of the element;
(b) the memory is configured to store at least one of (a) contact data and/or (b) appointment data of a user, at least one of (a) the decision processor configured to take into account the at least one of (a) the contact data and/or (b) the appointment data in evaluation of the relevance of the displayable elements and/or (b) the control device configured to take into account the at least one of (a) the contact data and/or (b) the appointment data in a type of display of the elements; and/or
(c) the memory is configured to store a user profile.

20. The display device according to claim 18, further comprising an interface to a vehicle bus, vehicle state information transmittable via the interface.

21. The display device according to claim 18, wherein the display is configured for autostereoscopic display of the elements.

22. The display device according to claim 18, further comprising an air interface for wireless transmission of the displayable elements.

23. The display device according to claim 18, further comprising manual setting controllers configured to set a mood of a user.

24. The display device according to claim 23, wherein the decision processor is configured to take a setting of the setting controllers for the user's mood into account in evaluation of the relevance of the elements displayable on the map.

25. The display device according to claim 18, wherein the display device is arranged in the motor vehicle.

* * * * *

UNITED STATES PATENT AND TRADEMARK OFFICE
CERTIFICATE OF CORRECTION

PATENT NO. : 8,370,058 B2
APPLICATION NO. : 11/919620
DATED : February 5, 2013
INVENTOR(S) : Waeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1479 days.

Signed and Sealed this
First Day of September, 2015

Michelle K. Lee
*Director of the United States Patent and Trademark Office*